United States Patent [19]

Styczynski

[11] 3,780,438
[45] Dec. 25, 1973

[54] RIFLING LANDS INSPECTION GAGE
[75] Inventor: Robert J. Styczynski, Wynantskill, N.Y.
[73] Assignee: The United States of America as represented by the Secretary of the Army, Washington, D.C.
[22] Filed: Aug. 20, 1971
[21] Appl. No.: 173,521

[52] U.S. Cl. ............................. 33/174 R, 33/178 F
[51] Int. Cl. ............................................. G01b 7/12
[58] Field of Search ................... 33/174 R, 178 R, 33/178 F, 199 R, 199 A, 147

[56] References Cited
UNITED STATES PATENTS
2,434,535   1/1948   Anders............................ 33/199 A
3,150,450   9/1964   DeMare............................ 33/178 F Primary Examiner—Harry N. Haroian
Attorney—Harry M. Saragovitz et al.

[57] ABSTRACT

A gage for inspecting the lands of a rifled barrel bore for erosion comprises a slider and a push rod axially disposed therein for displacing a feeler radially against one of the lands during movement of the slider along the bore. Radial deviations in the land are measured by calibrations on the push rod and the location of a deviation is indicated by graduations on the slider. Numbered radial lines on a supporting plug, respectively referenced to the lands, indicate the one thereof contacted by the feeler.

6 Claims, 3 Drawing Figures

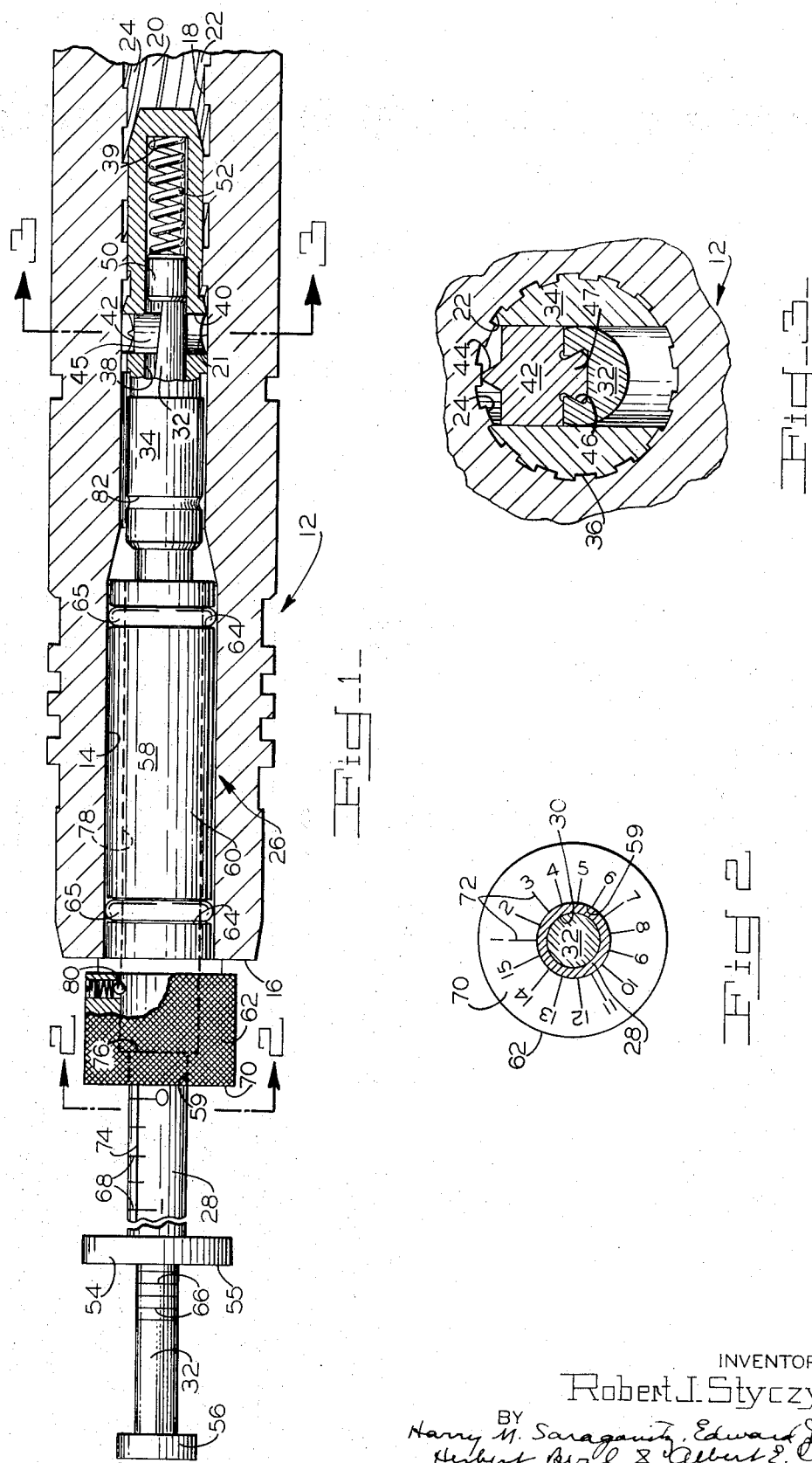

RIFLING LANDS INSPECTION GAGE

BACKGROUND OF THE INVENTION

This invention relates to gages and pertains more particularly to gages for inspecting the rifled bores of gun barrels.

The military value of most firearms is no greater than the accuracy of their barrels. The accuracy of a barrel is affected considerably by the erosion of the bore and the strippage of the rifling lands therein. As a consequence, the muzzle velocity is reduced by reason of the passage of some of the discharge gases around the projectile during flight along the bore, so that total discharge energy is not effectively applied to the projectile. Moreover, when the erosion has progressed to the extent that portions of some of the lands are totally stripped, yawing results from the less than optimum engagement of the projectile with the rifling lands which function to impart the required spin to the projectile.

The present means available to the gunners in the field for checking the condition of a barrel bore is a wear gage which is inserted into the bore from the chamber. The remaining life of the barrel is supposedly determined by the degree of insertion of the gage into the bore. This provides, at best, only a rough estimate of the bore condition and is often erroneous as the depth of insertion is controlled by only those lands which are in the best condition and these can be as few as three before the degree of strippage is evident. The wear gage, too, does not measure the length of any strippage or indicate the number and the location of those lands which have strippage portions.

SUMMARY OF THE INVENTION

The inaccuracies which exist in the present system of barrel bore inspection are overcome by the present invention which presents a gage comprising a slider which is slidable along the bore and a push rod axially disposed within the slider for thumb displacement against a feeler for radial displacement thereof against one of the rifling lands during movement of the slider therealong. Any radial deviation in the height of the land is felt by the inspector and is measured by calibrations on the push rod as referenced by the rear face of the slider. The distance of the area of strippage from the point of origin of the rifling is indicated by graduations on the slider as referenced by a supporting plug which is inserted into the barrel chamber to assist in slidingly supporting the slider and which also acts as a point of reference for reading such graduations. A reference line along the slider, as related to numbered radial lines, equal to the number of lands, inscribed around the face of the supporting plug, indicates which one of the lands is selected for inspection by the feeler.

BRIEF DESCRIPTION OF THE DRAWINGS

FIG. 1 is a longitudinally cross-sectioned view of a gun barrel with the gage of this invention installed therein;

FIG. 2 is an enlarged sectional view taken along line 2—2 of FIG. 1; and

FIG. 3 is a fragmentized and enlarged sectional view taken along line 3—3 of FIG. 1.

Shown in the drawings is a gun barrel 12 comprising a chamber 14, which extends forwardly thereinto from breech end 16, and a bore 18 extending coaxially therefrom. Bore 18 is provided with rifling 20 which originates at a forcing cone 21 spaced forwardly of chamber 14 and which includes a plurality of spiral grooves 22 and lands 24 formed therebetween. A gage 26 for checking lands 24 as to wear and strippage is shown installed within chamber 14 and bore 18.

Gage 26 comprises a tubular slider 28 with an axial bore 30 which slidingly receives a push rod 32. Fixed to the front end of slider 28 is a cylindrical head 34 which has a sliding fit, with a minimum tolerance, with bore 18 and is exteriorly provided with spiral channels 36 that slidingly engage with lands 24 to permit sliding displacement of the head along the bore. A cylindrical hole 38 extends from bore 30 to an end wall 39 in head 34 and an orifice 40 extends diametrically therethrough to intersect such hole and one of the channels 36. A cylindrical feeler 42 is slidingly received by orifice 40 and is provided with a conical point 44 which extends coaxially from the outside end of the feeler so as to be contactable with one of the lands 24 when head 34 is located within bore 18. The forward end of push rod 32 is forwardly tapered, as indicated at 45, and is provided with a dovetail mortise 46 for sliding engagement with a mating dovetail tenon 47 formed in the inner end of feeler 42, as shown in FIG. 3. Thus, longitudinal displacement of push rod 32 is converted to radial movement of feeler 42. A compression coil spring 52 is located in hole 38 between a follower 50 and end wall 39 for biasing push rod 32 rearwardly in slider 28. To provide for easy manual operation of gage 26, a ring 54 is fixed to the rear end of slider 28 and a circular cap 56 is fixed to the rear end of slider 28 and a circular cap 56 is fixed to rear end of push rod 32 so that the push rod may be pressed inwardly manually, relative to the slider, similar to the action and motion when using a hypodermic needle while the same hand can also be used for moving the gage along bore 18.

The rear section of slider 28 is slidingly supported, to maintain head 34 in coaxial relationship with the central axis of bore 18, by a supporting plug 58 having an aperture 59 therethrough in journaled engagement with the slider, a shank section 60 receivable by chamber 14 and a large diameter section 62 which has contact with breech end 16 when section 60 is installed in chamber 14. A pair of annular channels 64 are provided in longitudinally spaced relationship around shank section 60 and each of the channels seats an O-ring 65 of resilient material thereby to resiliently hold supporting plug 58 within chamber 14 and in coaxial alignment therewith.

Engraved around the outside of push rod 32 are calibrations 66 which indicate in fractions of an inch the corresponding amount of radial displacement of feeler 42, using rear end 55 of slider 28 as a plane of reference. The outside of slider 28 is similarly inscribed with graduations 68 which indicate in fractions of an inch the amount of longitudinal displacement of the slider relative to the origin of rifling in bore 18, using rear surface 70 of supporting plug 58 as a plane of reference.

Rear surface 70 is engraved with a plurality of successively numbered lines 72, equal to the number of lands 24, which extend radially from aperture 59, as shown in FIG. 2. Each of the lines 72 corresponds to one of the lands 24. Provided longitudinally along the outside surface of slider 28, so as to intersect graduations 68, is a reference line 74 which provides a reference relative to radial lines 72 for indicating the one of the lands 24 which is selected for inspection.

Supporting plug 58 is counterbored from the front and thereof to a surface 76 which is located therefrom a distance equal to the length of head 34 and to a diameter equal to the largest diameter thereof to thereby form a compartment 78 for receiving the head for protection thereof when gage 26 is not in use. A spring pressed ball 80 is mounted in supporting plug 58 for cooperation with an annular groove 82 around head 34 to releasably hold the supporting plug therein.

Initiation of the inspection of bore 18, to determine whether any portion of lands 24 thereof have been stripped, commences by inserting head 34 into the bore and rotating it until channels 36 in the head engage the lands. Supporting plug 58 is inserted into chamber 14 to where large diameter section 62 contacts breech end 16 and is then rotated to where reference line 74 is in alignment with the one of the radial lines 72 which is marked "1." Slider 28 is then moved into bore 18 to where the one of the graduations 68 marked "0" is in alignment with rear surface 70 of supporting plug 58. This indicates that point 44 is located at the beginning of rifling 20 in forcing cone 21. Push rod 32 is then pressed inwardly against the bias of spring 52, by thumb pressure applied against cap 56, until stopped by contact of point 44 with the surface of the engaged land 24. Slider 28 is then pushed inwardly to move head 34 along bore 18 and point 44 along the engaged land 24 with pressure still applied to push rod 32. If point 44 locates a stripped portion in land 24 it will, consequently, be free to move radially inwardly to the extent of the strippage to thereby indicate the presence thereof both by feel and by visual observation of graduations 66. Graduations 66 will indicate the radial depth to which the land 24 is stripped and calibrations 68 will indicate the distance of the stripped area from the beginning of rifling 20 and its extent therealong. These readings may be noted and compared to acceptable tolerances or, in a testing laboratory, the readings may be transferred graphically to a developed representation of bore 18 for study.

When the inspection of land "1" is completed, slider 28 is pulled rearwardly, to where point 44 is clear of forcing cone 21, and rotated to where reference line 74 is in alignment with the next land, marked as "2" on radial lines 72. That land 24 is then inspected as hereinbefore described and any stripped portions noted or marked on the bore representation. This continues until all of the lands are inspected. It is also evident that gage 26 may be used for gaging the wear of lands 24 to determine the remaining life of barrel 12.

When gage 26 is adapted to inspect bore 18 in a gun in which rifling 20 comprises 15 lands 24, there are 15 radial lines 72, numbered from 1–15, engraved in rear surface 72. It is found that the area of bore 18 along which lands 22 may be stripped extends thereinto less than 12 inches and therefore calibrations 68 extend along slider 28 from 0 to 12 inches in increments of one-eighth inch. With support plug 58 fully inserted into chamber 14, point 44 will be at the origin of rifling 20, at the rear end of forcing cone 21, when the first of the graduations 68, marked "0," is in line with rear surface 70. The length of forcing cone 21 is about 1 inch and therefore point 44 is not located to where rifling 20 is full depth until the "1" inch mark on graduations 68 is in line with rear surface 70.

The radial distance from the axial center line of head 34 to the tip of point 44, when fully extended, is 0.395 inch, the same as the distance from the centerline of bore 18 to the surface of a land 24. The angular inclination of dovetail mortise 46 is 2°33'; therefore, for each one-eighth inch of axial displacement of push rod 32, relative to slider 28, point 44 moves out radially 0.0055 inch. The height of each land 24 is 0.017 inch; therefore, if push rod 32 has to be displaced outwardly three-eighths inch for point 44 to make contact with bore 18 at any point therealong this indicates that land 24 has been totally stripped at that particular location.

I wish it to be understood that I do not desire to be limited to the exact details of construction shown and described, for obvious modifications will occur to a person skilled in the art.

I claim:

1. A gage insertable into the bore of a rifled gun barrel from the breech end thereof for measuring variations in the radial dimension of an individual rifling land along the length thereof, said gage comprising,
    a hollow plug insertable into the breech end of the barrel for mating engagement therewith,
    a hollow slider extending through said plug in slidable mating engagement therewith,
    a plurality of helical channels surrounding said slider at the forward end thereof for engagement with the rifling lands in the gun barrel,
    a push rod slidably seated in said slider with one end protruding rearwardly therefrom,
    a feeler slidably seated in the forward end of said push rod and extending radially through said slider in position to align with one of the rifling lands in the gun barrel subsequent to the slidable engagement of the lands with said slider,
    cam means on said push rod for converting longitudinal movement thereof relative to said slider into radial displacement of said feeler, and
    spring means biasing said push rod rearwardly relative to said slider to normally retract said feeler into said slider until said push rod is manually advanced relative to said slider to actuate said feeler into measuring contact with said one of the rifling lands in alignment therewith.

2. The gage defined in claim 1 wherein said cam means for converting longitudinal movement of said push rod relative to said slider into radial displacement of said feeler comprises,
    a forwardly tapered surface on the forward end of said push rod slidably engageable with the underside of said feeler, and
    cooperating dovetail means for providing said slidable engagement between said push rod and said feeler.

3. The gage defined in claim 2 including a plurality of longitudinally spaced annular graduations on the exterior of said push rod cooperating with the rear end of said slider to indicate the extent of the relative movement therebetween, the distance between each of said graduations being selected in accordance with the angularity of said forwardly tapered surface on said push rod to indicate the extent of the corresponding radial movement imparted to said feeler.

4. The gage defined in claim 3 including,
    a plurality of radial graduations spaced around the rear face of said hollow plug in angular correspondence with the origin of each of the rifling lands in the gun barrel, and a longitudinal reference mark on the exterior of said slider in axial alignment with said feeler for cooperating with said radial graduations on said plug to indicate the particular rifling land in radial alignment with said feeler.

5. The gage defined in claim 1 including a plurality of longitudinally spaced graduations on the exterior of said slider cooperating with the rear face of said hollow plug to indicate the location of said feeler forwardly of the origin of the rifling lands in the gun barrel.

6. The gage defined in claim 1 wherein said slider is provided with an annular groove and said hollow plug includes, a counterbored compartment for housing the forward end of said slider during the withdrawal of the gage from the gun barrel, and detent means engageable with said annular groove to releasably retain said slider in said compartment until the gage is again inserted into the gun barrel to engage with the rifling lands therein.

* * * * *